No. 769,568. PATENTED SEPT. 6, 1904.
W. T. ROBERTS & W. H. RILEY.
GAS BURNER.
APPLICATION FILED JAN. 26, 1904.
NO MODEL. 2 SHEETS—SHEET 2.
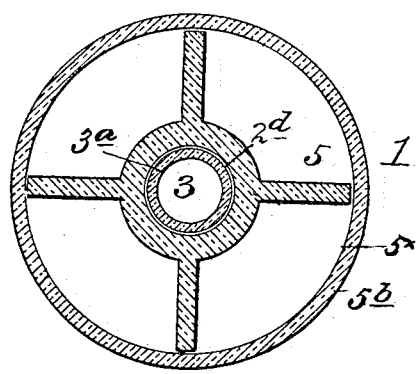
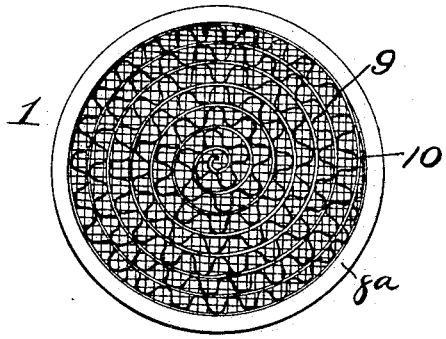
Witnesses:
Inventors:
Wm. T. Roberts.
Wm. H. Riley,
By
Attorneys.

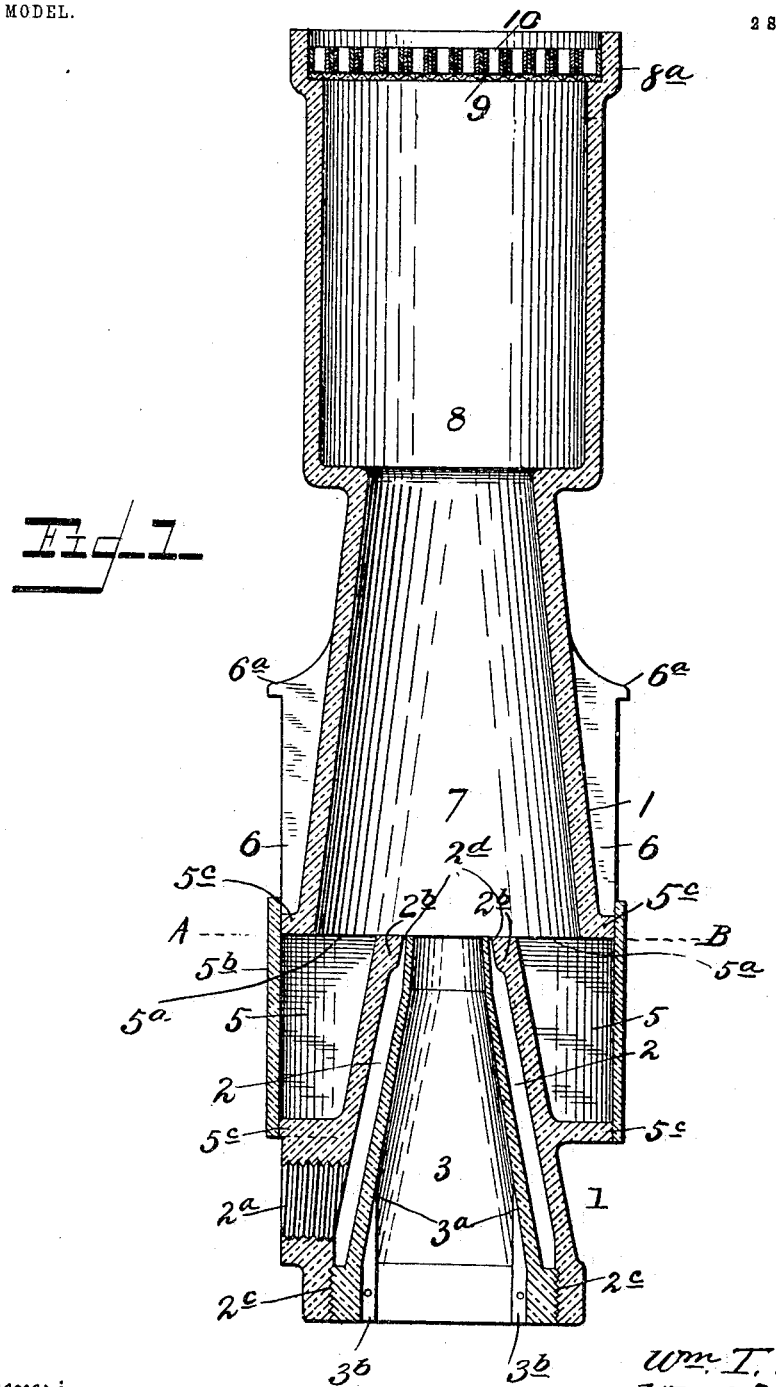

No. 769,568.

Patented September 6, 1904.

UNITED STATES PATENT OFFICE.

WILLIAM T. ROBERTS AND WILLIAM H. RILEY, OF EAST LIVERPOOL, OHIO.

GAS-BURNER.

SPECIFICATION forming part of Letters Patent No. 769,568, dated September 6, 1904.

Application filed January 26, 1904. Serial No. 190,662. (No model.)

*To all whom it may concern:*

Be it known that we, WILLIAM T. ROBERTS and WILLIAM H. RILEY, citizens of the United States, residing at East Liverpool, in the county of Columbiana and State of Ohio, have invented new and useful Improvements in Gas-Burners, of which the following is a specification.

Our invention relates to improvements in gas-burners, more especially for natural gas.

It has for its object, among other things, to so regulate the gas and air supply as to effect the perfect commingling or assimulating of the same; to provide for compressing these vapors or fluids during their passage through the mixing-chamber, and also permitting them to expand while yet in the latter chamber and finally submitting them to a comminuting or screening action at the point of combustion, thus obtaining, it is believed, the highest possible heating action, as well as the best or maximum illumination.

Said invention consists of the novel structural features substantially as hereinafter more fully disclosed by the following description and particularly pointed out by the claims concluding said description.

In the accompanying drawings, illustrating the preferred embodiment of our invention, Figure 1 is a longitudinal section. Fig. 2 is a cross-section produced on the line A B of Fig. 1, and Fig. 3 is an end elevation.

In the carrying out of our invention we preferably cast or construct the burner of a gas-chamber 1 in general outline, cylindric in cross-section, but of varying dimensions in longitudinal section, as shown, the same being inward tapering or convergent, provided with a lateral, preferably screw-threaded, inlet or opening $2^a$ to effect suitable pipe connection with a source of natural-gas supply. The chamber 1 has its extreme convergent or tapered end portion abruptly contracted, as at $2^b$, and interiorly of said chamber and removed therefrom a short interval intermediately of its ends is a second or air-delivery chamber 2, formed by an inward or converging wall or tube $3^a$. The outer or flared end of the latter has a screw-threaded connection with the corresponding screw-threaded end of chamber 1, as at $2^c$, an additional purpose of which will be presently apparent. The inner end portion of said chamber 2 is in close proximity to the corresponding portion $2^b$ of the chamber 1, thus providing a very contracted annular or circular passage $2^d$ therebetween of minimum cross-sectional area, causing the issuance of the gas therefrom in corresponding form or jet, under increased pressure or compression, where it unites or commingles with a much greater proportional supply of air admitted via the chamber 2 interiorly of said gas-jet, effecting the best possible assimulation of one with the other, said fluids or gas and air being delivered at this juncture into the mixing-chamber, later described. By suitably adjusting the tube $3^a$ by applying a wrench to the interior thereof, engaging ribs $3^b$ thereon, it will be noted that said tube may be screwed inward or outward and its inner end accordingly be so moved or disposed with relation to the corresponding end portion of the wall of the chamber 1, and thus provide for controlling the supply of gas to the mixing-chamber and the proportional mixing of the gas and air supply, as may be required. An additional or supplemental subdivided air-chamber 5, preferably annular or circular, is also provided, the same encompassing and having its bottom formed by one wall of the gas-supply chamber 1 and having circular air-inlets $5^\times$ and opening, as at $5^a$, into the mixing-chamber for delivering or feeding, as indicated by the designation of said chamber, an additional air-supply to the gas-supply. Said air-inlets $5^\times$ are closed by a ring or valve $5^b$, fitted upon or encompassing annular portions $5^c$ thereof, forming a seat for said ring or valve, as shown, one of said annular portions having extending therefrom, longitudinally of the chamber 1, ribs or ways 6 for the sliding thereon of said ring or valve, as in opening the same for feeding additional air-supply, said ribs or ways having inner end terminals or shoulders $6^a$ to limit the opening movement of said valve and prevent its displacement.

A conical mixing-chamber 7, above mentioned, has its flared end in communication with the gas-chamber 1 and the primary and supplemental air-chambers 2 and 5 and its tapering or reduced end terminating in and having formed in continuation thereof a larger cylindric chamber 8, itself somewhat enlarged at its extreme distant end, as at $8^a$, within which are suitably arranged and secured a fine wire screen 9 and a corrugated iron screen 10, of coarser mesh than and strengthening or reinforcing the former screen, as shown. Said mixing-chamber being, as before noted, tapering toward its delivery end has the effect, after the thorough or effective commingling of the gas and air vapors therein, to also compress the mixture thus produced, and thus intensify the assimulating action of said vapors one with the other, it finally, upon passing from said chamber, being permitted to enter and again expand in the chamber 8, whence it passes or is fed out through the screens 9 10 for ignition or utilization for heating or illuminating purposes, as may be required or needed. Said gas or air vapors have, it is believed, now reached the highest point of admixture possible of attainment and which mixture is productive of the maximum heating action and highest illuminating quality obtainable from natural gas, while the expense attending the use of our burner is greatly reduced in being enabled to use a relatively smaller amount of gas and securing a proportionally greater amount of heat and light.

Latitude is allowed as to details herein, as they may be changed without departing from the spirit of our invention and said invention still be protected.

We claim—

1. A gas-burner, having a gas-receiving chamber tapered from the inlet-opening inward and of a uniform narrow cross-sectional area to the gas-delivery jet-opening, a tapering air-receiving chamber, with their tapered end portions so arranged as to provide therebetween an annular delivery jet-opening, a tapered mixing-chamber, communicating with said gas and air receiving chambers, and an enlarged chamber arranged in communication with said mixing-chamber and having a screen in its delivery end.

2. A gas-burner, having an air-inlet opening, a gas-receiving chamber tapered from said inlet-opening inward, an inner tapering air-receiving chamber, an additional air-receiving chamber having lateral openings and a covering ring or valve therefor, said burner having guideways or ribs upon which said valve or ring may be slid or moved in establishing communication between said additional air-chamber and the external atmosphere, said gas and first-referred-to air-receiving chambers having an annular jet-opening between their delivery end portions.

3. A gas-burner, comprising a tapered gas-receiving chamber, a tapering air-receiving chamber, said chambers having their delivery ends so arranged as to provide therebetween an annular jet-opening, an additional air-receiving chamber means adapted to control the entrance of the air thereto, a tapering mixing-chamber in communication with the aforesaid chambers, an expansion-chamber opening into said mixing-chamber, and provided at its somewhat-enlarged delivery end with screens, one coarser than and reinforcing, the other.

In testimony whereof we have signed our names to this specification in the presence of two subscribing witnesses.

WILLIAM T. ROBERTS.
WILLIAM H. RILEY.

Witnesses:
G. E. DAVIDSON,
M. E. HILTY.